United States Patent
Lau

(10) Patent No.: US 7,958,904 B2
(45) Date of Patent: Jun. 14, 2011

(54) COLLAPSIBLE HUNTING BLIND

(76) Inventor: Chi Hung Fermi Lau, KowLoon (HK)

( * ) Notice: Subject to any disclaimer, the term of this patent is extended or adjusted under 35 U.S.C. 154(b) by 4 days.

(21) Appl. No.: 12/317,125

(22) Filed: Dec. 19, 2008

(65) Prior Publication Data

US 2010/0154282 A1 Jun. 24, 2010

(51) Int. Cl.
*E04H 15/48* (2006.01)
(52) U.S. Cl. .......................................................... 135/147
(58) Field of Classification Search ................. 135/147, 135/143, 157, 901
See application file for complete search history.

(56) References Cited

U.S. PATENT DOCUMENTS

| | | | | |
|---|---|---|---|---|
| 3,810,482 A | * | 5/1974 | Beavers | 135/147 |
| 3,968,809 A | * | 7/1976 | Beavers | 135/88.14 |
| 4,026,312 A | * | 5/1977 | Beavers | 135/147 |
| 4,077,417 A | * | 3/1978 | Beavers | 135/121 |
| 4,202,065 A | * | 5/1980 | Sullivan | 5/99.1 |
| 4,819,680 A | * | 4/1989 | Beavers | 135/125 |
| 5,628,338 A | * | 5/1997 | Stumbo | 135/147 |
| 6,296,415 B1 | * | 10/2001 | Johnson et al. | 403/170 |
| 6,772,458 B2 | * | 8/2004 | Ellen et al. | 5/424 |
| 7,565,909 B2 | * | 7/2009 | Reis et al. | 135/115 |
| 2006/0207641 A1 | * | 9/2006 | Reis et al. | 135/87 |

* cited by examiner

*Primary Examiner* — David Dunn
*Assistant Examiner* — Noah Chandler Hawk
(74) *Attorney, Agent, or Firm* — Raymond Y. Chan; David and Raymond Patent Firm

(57) ABSTRACT

A collapsible hunting blind includes a blind awning and a collapsible frame. The blind awning includes two sidewalls, a front wall, a rear wall, and a top wall. The collapsible frame includes a retention frame and two tensional frames. The retention frame is detachably coupling between the sidewalls to retain a distance therebetween at the setup position, wherein when the retention frame is released from the sidewalls, the sidewalls are adapted to overlap with each other at the folded position. The two tensional frames are provided at the sidewalls respectively for providing a tensional force thereat at the setup position to stretch out the sidewalls in a tensional manner. When each of the tensional frames is actuated to reduce the tensional force at the respective sidewall of the blind awning, the sidewall is adapted to overlappedly fold into a compact structure at the folded position.

11 Claims, 8 Drawing Sheets

COLLAPSIBLE HUNTING BLIND

BACKGROUND OF THE PRESENT INVENTION

1. Field of Invention

The present invention relates to a hunting blind, and more particularly a collapsible hunting blind for quickly converting the hunting blind between a folded position and a setup position.

2. Description of Related Arts

The blinds are commonly used for hunting so that a hunting blind can cover a hunter from the observation of wild animals and avoids scaring away them. For instance, the hunter hides within the camouflage hunting blind waiting for the deer, the blind can shield the hunter from being seen by the deer so that the hunter is able to wait in the selected location and aim the deer from the window of the blind. Not only for hunting, but also the hunting blind can be used for research. Another example is a researcher hiding inside the blind to observe the wild Clouded Leopard's life.

Although different kinds hunting blind for hunters with different shapes are available, most of them contain the following drawbacks.

When searching of wildlife, hunters usually needs to be carry a couple of stuffs with them such as a gun, water storage, a telescope and etc. Thus, people are really looking forward to find hunting blind which is easy to assemble and disassemble, and is really light. However, the problem of convenience hunting blind is that the structure of the hunting blind is usually complicated which maximum the assembling time to set up the hunting blind. In other words, the body of the blind is usually more than three pieces, and each of them has to assemble together through different methods. While the hunter tries to assemble the hunting blind, it is very difficult for people to find a truly easy way to set up it. To make matters worse, the weight of some hunting blind is very heavy. It is a struggle for people to always carry them with themselves. Furthermore, people need to apply relatively more force to assemble and disassemble the hunting blind.

On the other hand, the wind-proof ability of some hunting blinds is bad. Especially when it is used in windy days, the unstable structure makes the hunting blind shake in the windy days. Moreover, the air of some inner hunting blinds is stuffy while the hunter is standing inside the blind. Waterproof ability is another question. As a matter of fact, hunters prefer to use the hunting blind which is durable and waterproof, most important of all, the requirement of being small, light weight, and more convenient for people to assemble and disassemble of the hunting blind is the trend for hunter to pursuits on hunting blind.

There exists a great demand for a light in weight, more portable and easy to be set up hunting blind, so that the hunting blind can be readily carried to a selected place such as a spot in the forest or jungle, and carry the hunting blind from one place to another in the hope of being at a better location. Frequently, to facilitate the mobility, the hunting blind should be able for being collapsed into a compact size and simply operated by one person.

Accordingly, the existed hunting blinds are still not capable for the above demands. The foldable hunting blinds in the market now are usually complicated to be set up and can be barely operated by himself or herself.

SUMMARY OF THE PRESENT INVENTION

A main object of the present invention is to provide a collapsible hunting blind so that the hunting blind can be easily folded and unfolded to a setup position by one person.

Another object of the present invention is to provide a collapsible hunting blind, wherein the folding operation of the hunting blind is simple and easy by overlapping two sidewalls of the hunting blind with each other and overlappedly folding each of the sidewalls into a compact structure.

Another object of the present invention is to provide a collapsible hunting blind, wherein the hunting blind is automatically unfolded into the setup position by means of the tensional force to provide a quick and simple unfolding operation of the hunting blind.

Another object of the present invention is to provide a collapsible hunting blind, wherein the hunting blind can be folded into a compact size, so that a hunter is able to carry the hunting blind as one of the hunting equipments and carry the blind from one to another place in the hope of being at a better location.

Another object of the present invention is to provide a collapsible hunting blind, wherein the hunting blind has a trapezoid shape so that the hiding area within the bind increases in height and decrease in width from bottom to top, such that the hunting blind has a stable structure and the hunter has enough space kneeing on the floor and standing up to get a better shoot or view.

Another object of the present invention is to provide collapsible hunting blind, wherein the structural configuration of the hunting blind is simple by providing two tensional frames at the sidewalls of the hunting blind so as to simplify manufacturing steps and decrease manufacturing cost.

Another object of the present invention is to provide a collapsible hunting blind, wherein the windows are provided entirely around the blind so that the windows can be opened to have a clear view to shoot through, take pictures, or observe the wild animals with a telescope.

Another object of the present invention is to provide a collapsible hunting blind with a door, wherein the door opening is from the bottom to the top of the blind with a zip opening attached along the rim of the door, so that the hunter can easily get in and out of the hunting blind.

Another object of the present invention is to provide a collapsible hunting blind, wherein the hunting blind has polarity stakes for digging into the ground and engaged with the corner of the hunting blind, so that the hunting blind can be stably fixed on the ground.

Another object of the present invention is to provide a collapsible hunting blind, wherein the hunting blind has a camouflage painting so that the blind is relatively more unobvious to the wild animals and match the color of the environment to have relatively better cover.

Accordingly, in order to accomplish the above objects, the present invention provides a collapsible hunting blind which comprises a blind awning and a collapsible frame adapted to fold the blind awning between a folded position and a setup position.

The blind awning comprises two sidewalls, a front wall, a rear wall, and a top wall and defining a hiding area within the sidewalls, the front wall, the rear wall and the top wall for a hunter hiding within the hiding area.

The collapsible frame comprises a retention frame and two tensional frames. The retention frame is detachably coupling between the sidewalls to retain a distance therebetween at the setup position, wherein when the retention frame is released from the sidewalls, the sidewalls are adapted to overlap with each other at the folded position. The two tensional frames are provided at the sidewalls respectively for providing a tensional force thereat at the setup position to stretch out the sidewalls in a tensional manner, wherein when each of the tensional frames is actuated to reduce the tensional force at the respective sidewall of the blind awning, the sidewall is adapted to overlappedly fold into a compact structure at the folded position.

These and other objectives, features, and advantages of the present invention will become apparent from the following detailed description, the accompanying drawings, and the appended claims.

DETAILED DESCRIPTION OF THE PREFERRED EMBODIMENT

Figure 1:
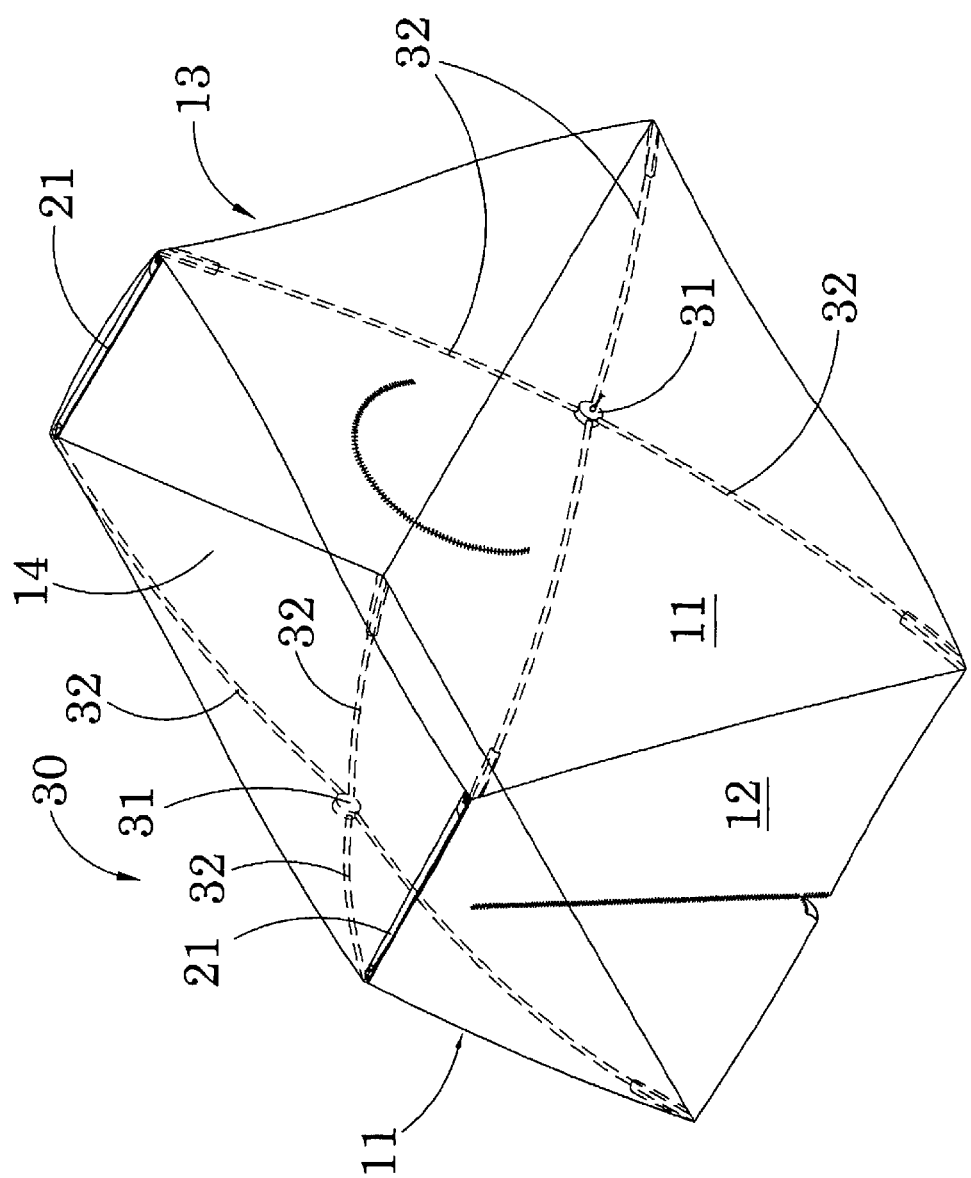
FIG. 1 is a perspective view of a collapsible hunting blind according to a preferred embodiment of the present invention.
Figure 2:
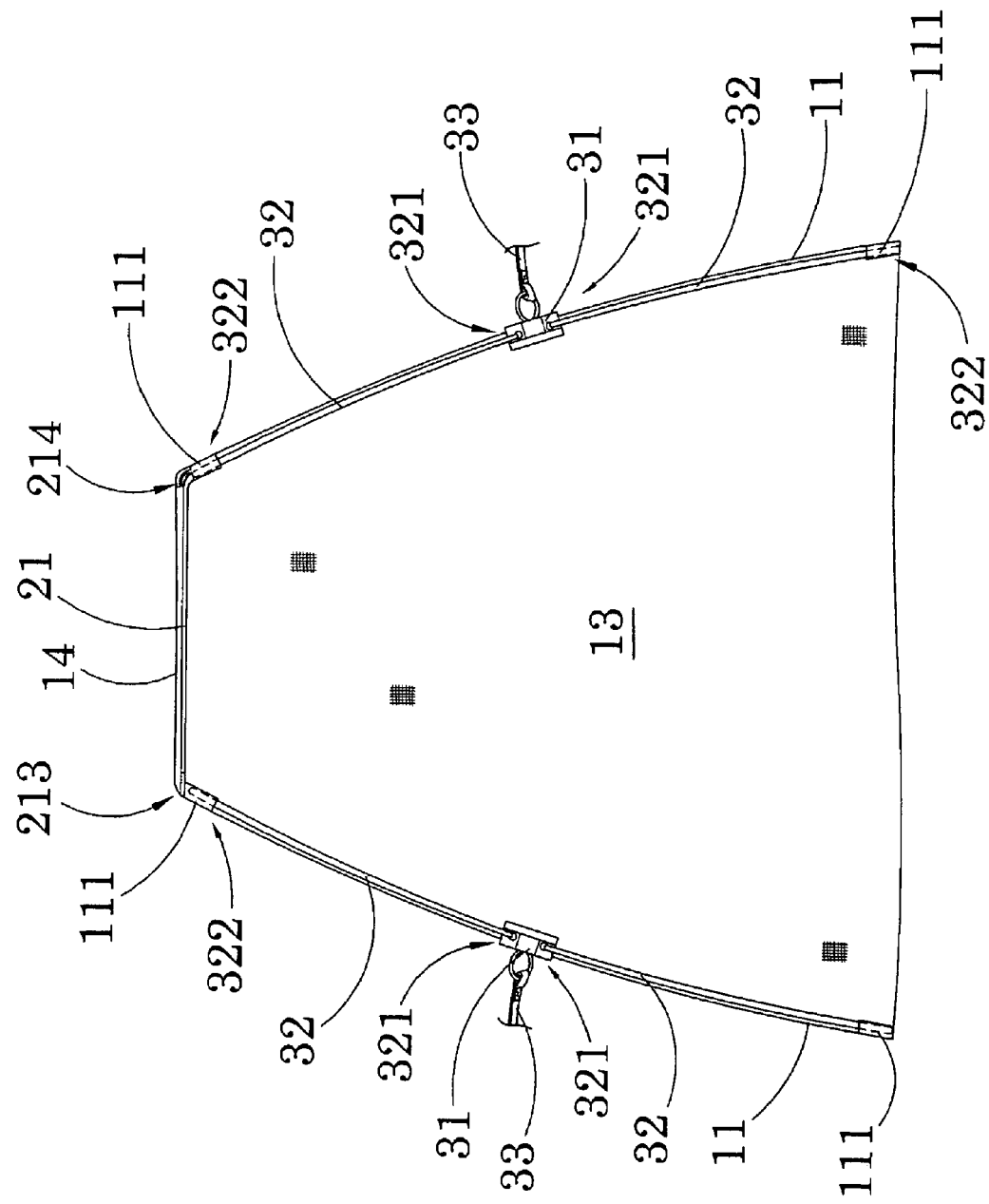
FIG. 2 is a side view of the collapsible hunting blind according to the preferred embodiment of the present invention, illustrating the two sidewalls being pop outwardly via the tensional frames.

Referring to FIGS. 1 and 2 of the drawings, a collapsible hunting blind at a setup position according to a preferred embodiment of the present invention is illustrated, wherein the hunting blind comprises a blind awning 10 and a collapsible frame adapted to fold the blind awning 10 between a folded position and a setup position.

The blind awning 10 has two sidewalls 11, a front wall 12, a rear wall 13, and a top wall 14 defining a hiding area within the sidewalls 11, the front wall 12, and the rear wall 13 for a hunter hiding within the hiding area.

The collapsible frame comprises a retention frame 20 and two tensional frames 30. The retention frame 20 is extended between the two sidewalls 11 to retain a distance therebetween at the setup position. When each of the tensional frames 30 is actuated to reduce the tensional force at the respective sidewall 11 of the blind awning 10, the sidewall 11 is adapted to overlappedly fold into a compact structure at the folded position.

As shown in FIGS. 1 and 2 of the drawings, each of the sidewalls 11 of the blind awning 10 has a rectangular shape ensuring tensional force from tensional frame 30 being evenly distributed at sidewalls. Each of the front wall 12 and rear wall 13 of the blind awning 10 has trapezoid shape, wherein the hiding area is gradually reducing toward the top wall so that the collapsible hunting blind has a stable structure.

As shown in FIG. 1, a plurality of window screens are provided with the blind awning 10, wherein each of the window screens can be opened or closed via a zipper for observation and air circulation, so that the hunter or the observer can have a clear view to shoot through, take pictures, or observe the wild animals with a telescope. Accordingly, a door with a zip opener is further provided at the front wall 14 for the hunter getting in and out the hunting blind easily.

According to the preferred embodiment, the retention frame 20 comprises at least two retention arms 21, preferably three retention arms 21, adapted to retain the distance between two sidewalls 11 of the blind awning 10 at the setup position. The two retention arms 21 are positioned at two sides of the top wall 14 respectively, wherein the third retention arm 21 can be positioned at the apex of the sidewall 11. Accordingly, each of the retention arms 21 has a length matching with a width of the top wall 14 to retain the distance between the sidewalls 11.

Figure 3:
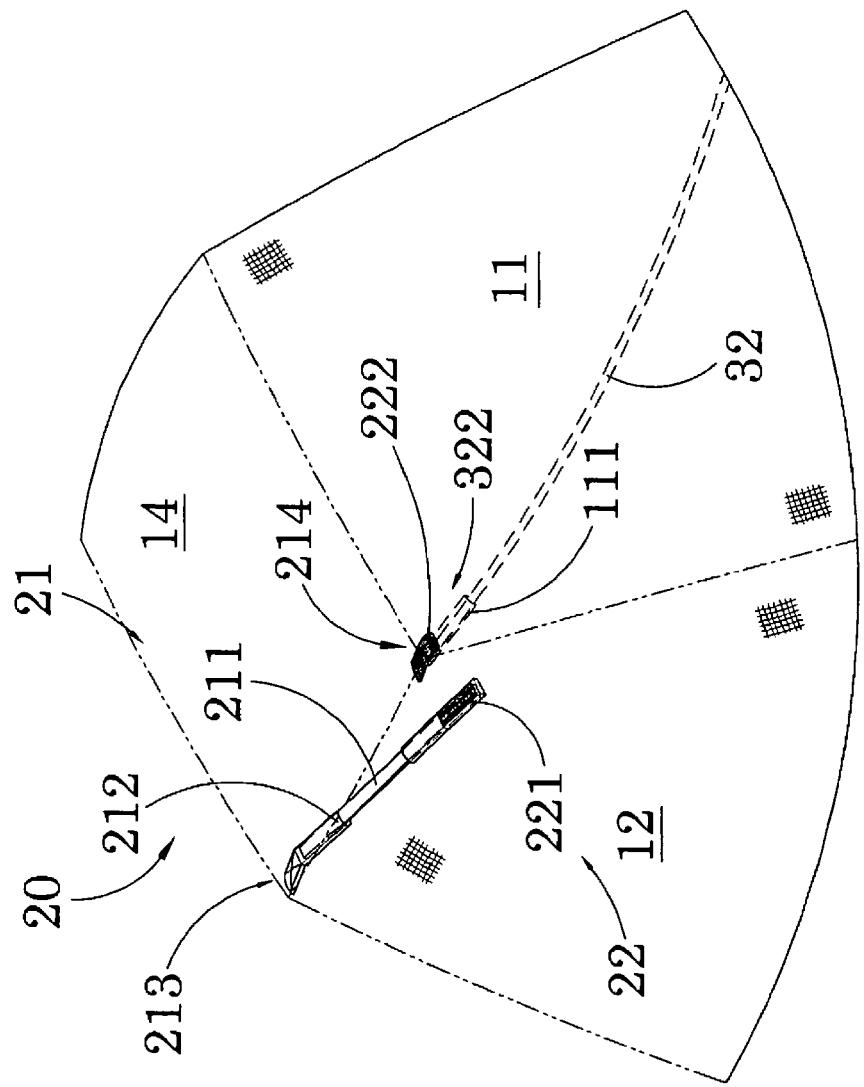
FIG. 3 is a perspective view of the retention frame of the collapsible hunting blind according to the above preferred embodiment of the present invention.

As shown in FIG. 3, each of the retention arms 21 has an affixing end 213 coupling with one of the sidewalls 11 and an opposed detachable end 214 detachably coupling with another sidewall 11, wherein when the detachable end 214 of the retention arm 21 is detached from the respective sidewall 11, the retention frame 20 is released between the sidewalls 11 so that the sidewalls 11 are adapted to overlap each other.

In particularly, the retention arm 21 comprises an elongated rod 211 to provide the strength for retaining the distance between two sidewalls 11, a retention pocket 212 for receiving the elongated rod 211 therein, wherein one end of the retention pocket 212 forms the affixing end 213 of the retention arm 21 to securely affix to the respective sidewall 11 while another end of the retention pocket 212 forms the detachable end 214 of the retention arm 21 to detachable affix to another sidewall 11 via a fastening unit 22, as shown in FIG. 2. Accordingly, the fastening unit 22 comprises a first fastener 221, such as a hook fastener, provided at the detachable end 214 of the retention arm 21 and a second fastener 222, such as a loop fastener, provided at the respective sidewall 11 to detachably fasten with the first fastener 221 such that the retention arm 21 is extended between the two sidewalls 11 to retain the distance therebetween.

It is appreciated that two ends of the retention arm 21 can be detachably affixed to the sidewalls 11 respectively via the fastening unit 22. For preventing the retention arm 21 from being lost or misplaced between the sidewalls 11, one end of the retention arm 21 is preferred to permanently affix at the sidewall 11 while another end of the retention arm 21 is selectively affix to another sidewall 11.

Each of the tensional frames 30 is provided at an inner side of the respective sidewall 11, such that when the tensional frame 30 is pulled outwardly, the respective sidewall 11 is popped and is stretched by means of tensional force as shown in FIG. 2.

Figure 4:
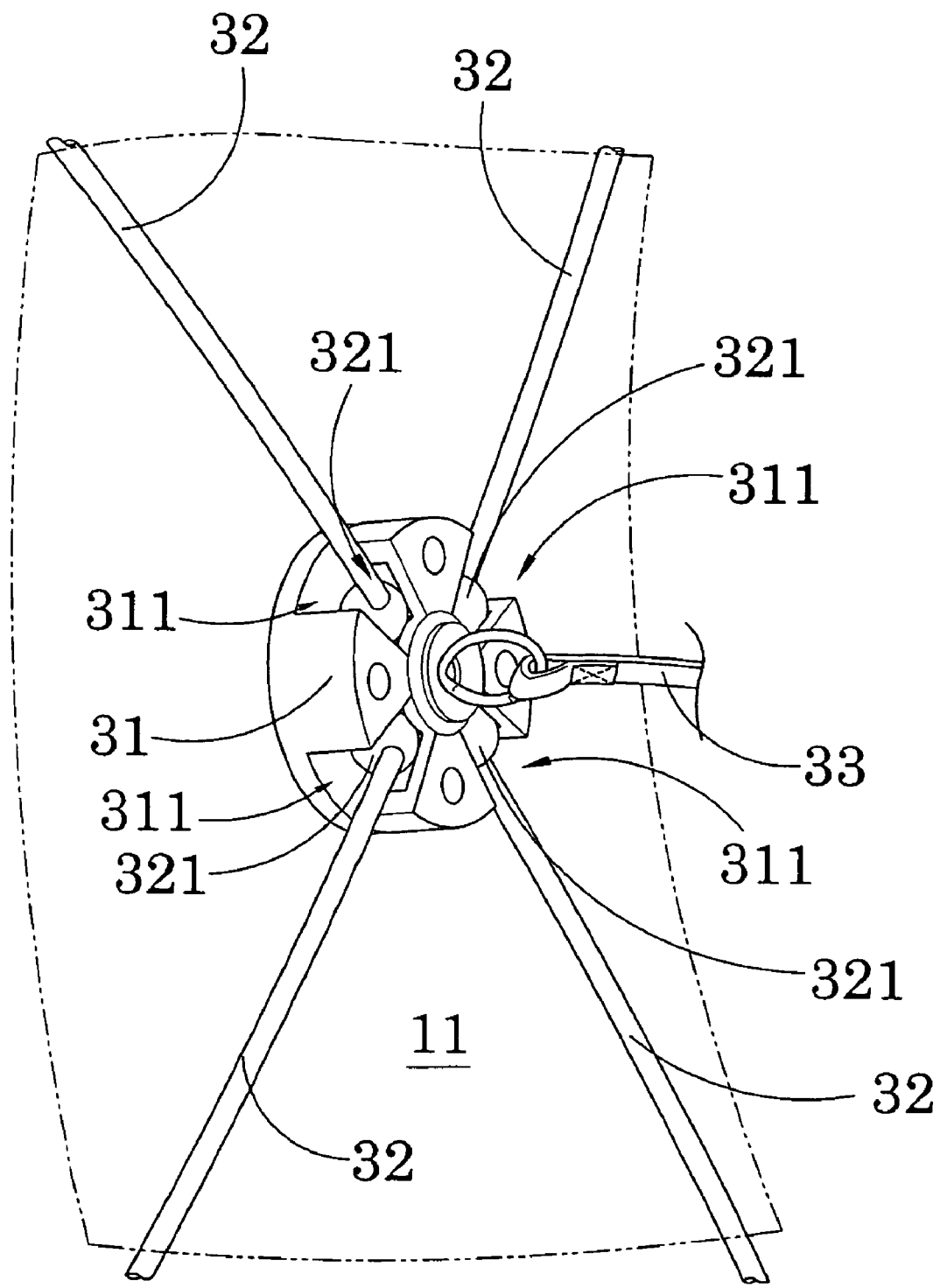
FIG. 4 is a perspective view of the tensional frame of the collapsible hunting blind according to the above preferred embodiment of the present invention.

As shown in FIGS. 3 and 4, each of the tensional frame 30 comprises an actuation member 31 and a plurality of flexible arms 32 radially extended from the actuation member 31, wherein each of the flexible arms 32 has an inner end 321 pivotally coupling with the actuation member 31 and an outer end 322 extended to couple at corner portion of the sidewall 11, in such a manner that when the actuation member 31 is pulled outwardly, the flexible arms 32 are bent outwardly to pop out the sidewall 11 in a tensionally stretchable manner, as shown in FIG. 2, and when the actuation member 31 is pushed inwardly, the tensional force is released at the respective sidewall 11 so as to allow the sidewall 11 being folded.

Accordingly, the actuation member 31 is affixed to a center of the respective sidewall 11 at the inner side thereof. Each of the tensional frames 30 contains four flexible arms 32 outwardly extended from the actuation member 31 and are diagonally extended at the respective sidewall 11 to form a "X" structure for providing a tensional force thereat at the setup position to stretch out the sidewall 11 in a tensional manner.

Figure 5:
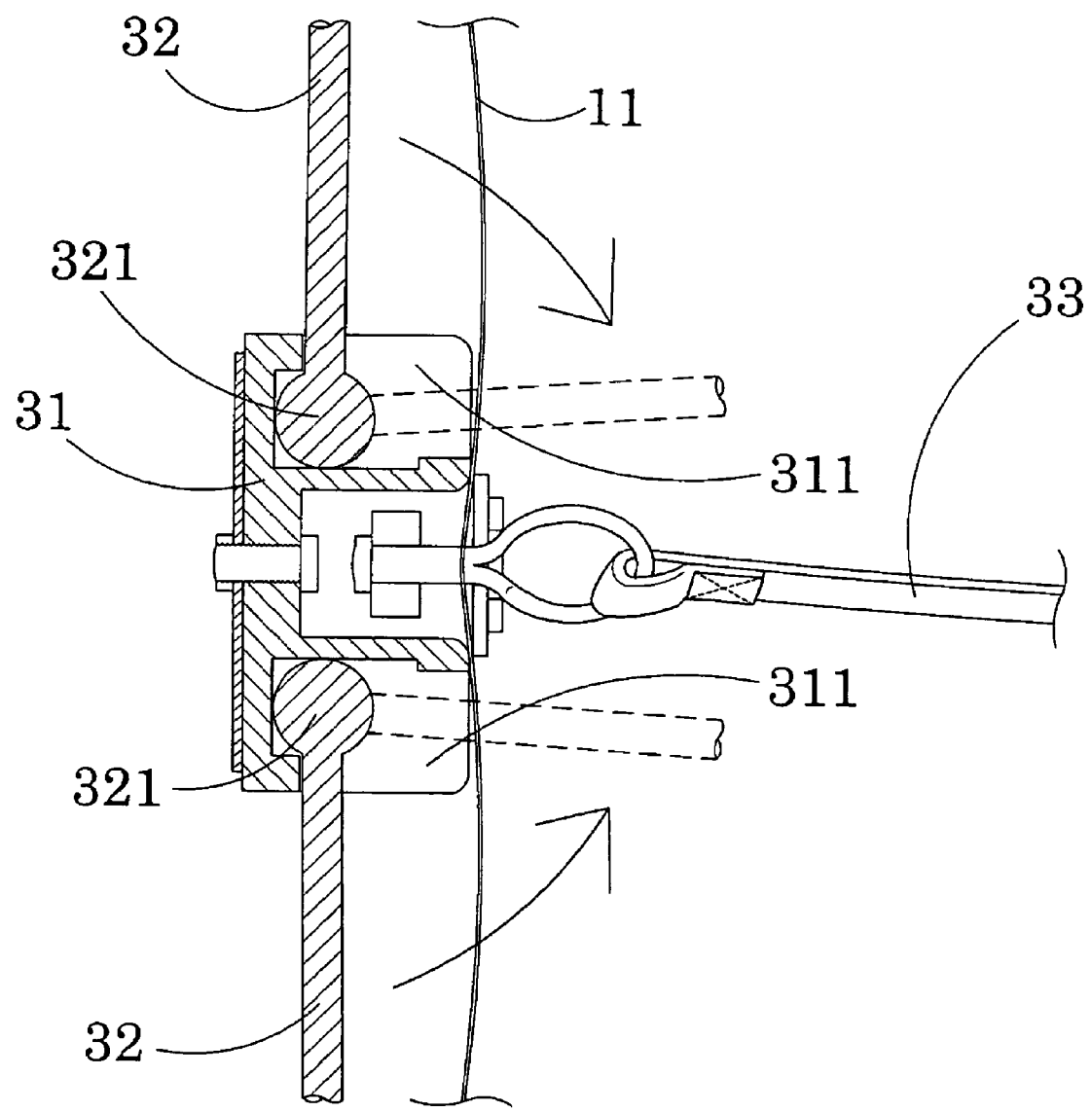
FIG. 5 is a sectional view of the tensional frame of the collapsible hunting blind according to the above preferred embodiment of the present invention.

As shown in FIGS. 4 and 5, each of the flexible arms 32 is coupled with the actuation member 31 via a ball-and-socket joint structure. In particular, the actuation member 31 has a plurality of engaging slots 311 for rotatably receiving the inner ends 321 of the flexible arms 32 respectively, wherein each of the engaging slots 311 has a spherical engaging surface as the socket structure. The inner end 321 of each of the flexible arms 32 has a ball shaped structure rotatably engaging with the engaging surface of the respective engaging slot 311 such that each of the flexible arms 32 is adapted to move around the actuation member 31. Therefore, when each of the tensional frames 30 is folded, the flexible arms 32 are rotatably folded to parallel with each other as shown in FIG. 5, so as to fold the respective sidewall 11 in a bundle form.

As shown in FIG. 3, each of the sidewalls 11 comprises a plurality of holding pockets 111 provided at the corner portions for receiving the outer ends 322 of the flexible arms 32 respectively so as to retain the tensional frame 32 in position.

Each of the tensional frames 30 further comprises a pulling strap 33 extended from the respective actuation member 31 at an outer side of the sidewall 11, as shown in FIG. 1, such that when the pulling strap 33 is pulled outwardly, the actuation member 31 is pulled to pop out the sidewall 11 through the flexible arms 32.

Figure 6:
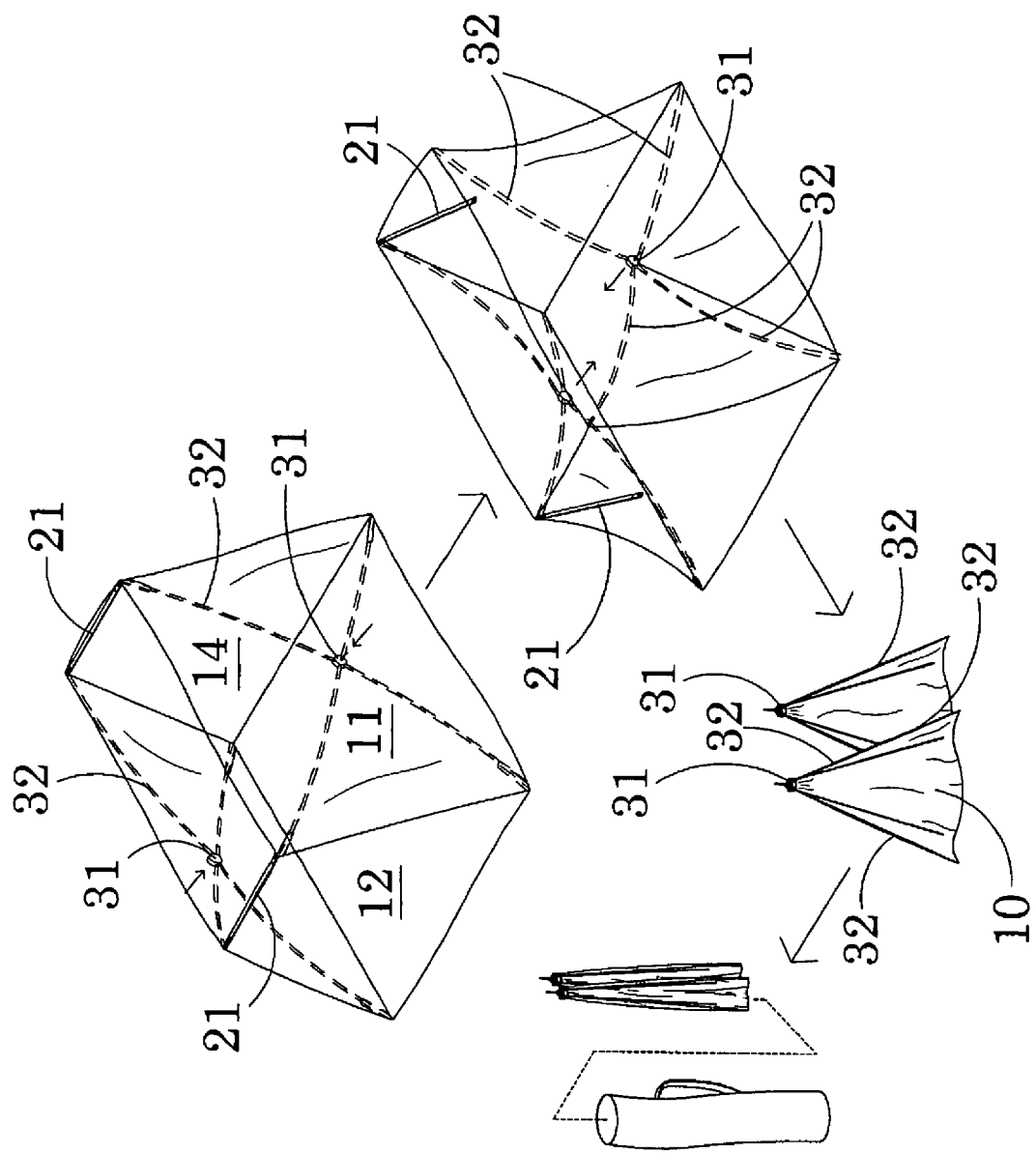
FIG. 6 is a schematic view of the collapsible hunting blind according to the preferred embodiment of the present invention, illustrating the folding operation of the collapsible hunting blind.

FIG. 6 illustrates the folding operation of the collapsible hunting blind. Accordingly, in order to fold up the collapsible hunting blind should detach the detachable ends 214 of the retention arms 21 from the respective sidewall 11 such that the two sidewalls 11 are adapted to overlap with each other. By applying an inward pushing force at each of the actuation members 31, the flexible arms 31 of each of the tensional frames 30 are pushed inwardly to release the tensional force at the respective sidewall 11. Then, each of the tensional frames 30 can be folded up by pivotally folding the flexible arms 32 such that the sidewalls 11 are folded into a bundle form. Therefore, the collapsible hunting blind is folded to a compact size as a stake form and be stored into a personal bag.

Figure 7:
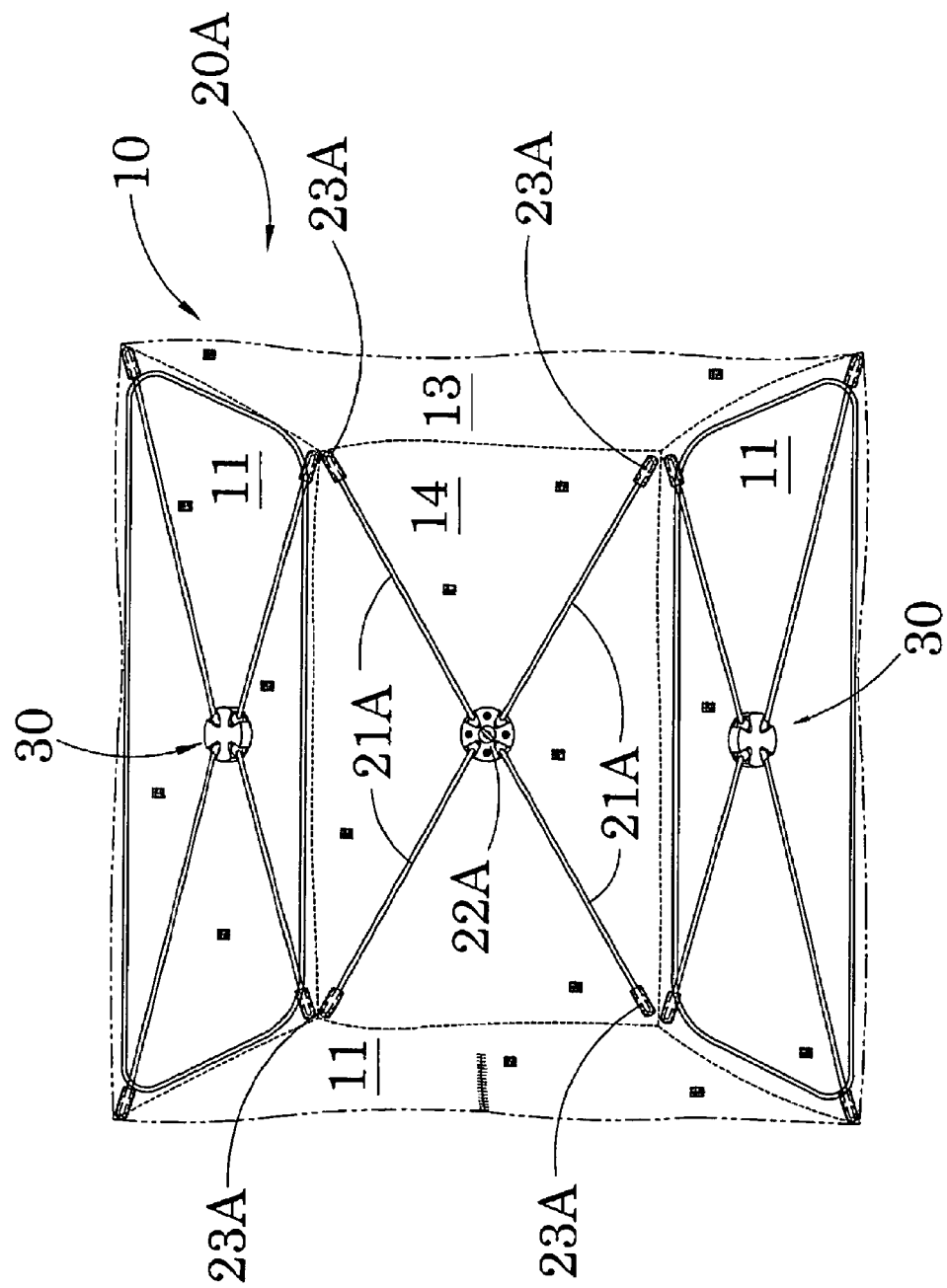
FIG. 7 is a top view illustrating an alternative mode of the retention frame at the top wall of the collapsible hunting blind according to the preferred embodiment of the present invention.
Figure 8:
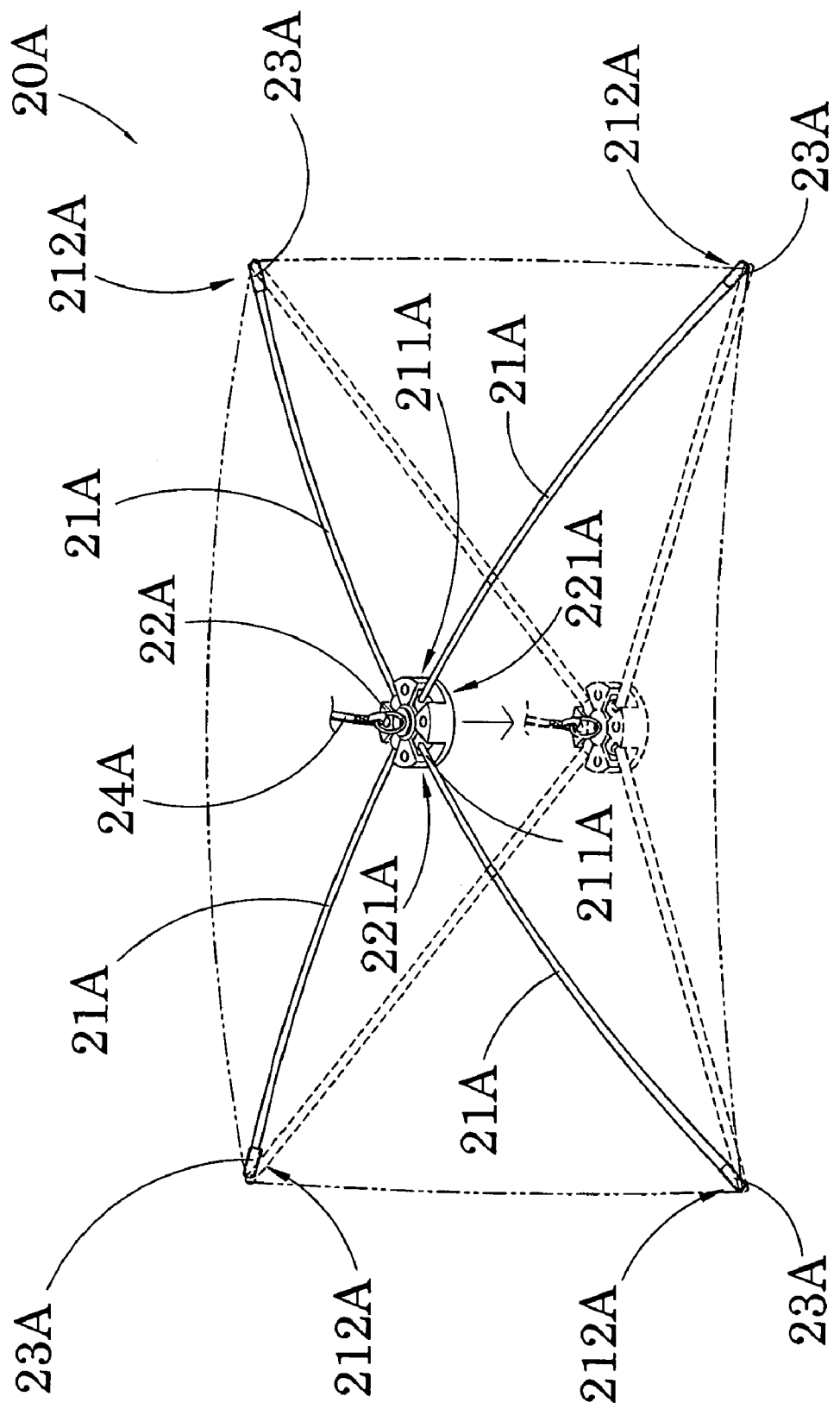
FIG. 8 is a perspective view of the alternative retention frame of the collapsible hunting blind according to the preferred embodiment of the present invention, illustrating the top wall being upwardly popped at the setup position.

FIGS. 7 and 8 illustrate an alternative mode of the retention frame 20A to retain the distance between the sidewalls 11 of the blind awning 10, wherein the retention frame 20A has a similar structural configuration of the tensional frame 30 to provide a tensional force at the top wall 14. Accordingly, the retention frame 20A, which is coupled at the inner side of the top wall 14 of the blind awning 10, comprises a retention member 22A and a plurality of top flexible retention arms 21A radially extended from the retention member 22A, wherein each of the flexible retention arms 21A has an inner end 211A pivotally coupling with the retention member 22A and an outer end 212A extended to couple at a corner portion of the top wall 14, in such a manner that when the retention member 22A is pulled upwardly, the flexible retention arms 21A are bent upwardly to pop the top wall 14 in a tensionally stretchable manner so as to retain the distance between the sidewalls 11.

Accordingly, the flexible retention arms 21A are diagonally extended at the top wall 14 to form a "X" structure. As shown in FIG. 7, a plurality of top holding pockets 23A are provided at the corner portions of the top wall 14 for receiving the outer ends 212A of the flexible arms respectively so as to retain the retention frame 20A in position.

The retention member 22A is affixed to a center of the top wall 14 and has a plurality of engaging slots 221A coupling with the inner ends 211A of the flexible retention arms 21A with a ball-and-socket joint structure, as shown in FIG. 8. A pulling strap 24A is extended from the actuation member 22A at an outer side of the top wall 14 such that when the pulling strap 24A is pulled upwardly, the actuation member 22A is pulled to pop out the top wall 14 through the flexible retention arms 21A to retain the distance between the sidewalls 11. When the retention member 22A is pulled downwardly, the flexible retention arms 21A are bent downwardly and folded in a bundle form such that the two sidewalls 11 are adapted to overlap with each other.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A collapsible hunting blind, comprising:

a blind awning comprising two sidewalls, a front wall, a rear wall, and a top wall and defining a hiding area within said sidewalls, said front wall, said rear wall and said top wall for a hunter hiding within said hiding area, wherein each of said front and rear walls has a trapezoid shape that said hiding area is gradually reducing towards said top wall;

a collapsible frame, which is adapted to fold between a folded position and a setup position, comprising:

a retention frame detachably coupling between said sidewalls to retain a distance therebetween at said setup position, wherein when said retention frame is detached from one of said sidewalls, said sidewalls are adapted to overlap with each other at said folded position, wherein said retention frame comprises two retention arms extended along two sides of said top wall respectively, wherein each of said retention arms has an affixing end permanently coupling with one of said sidewalls and an opposed detachable end detachably coupling with another said sidewall, wherein each of said retention arms comprises an elongated rod and a retention pocket receiving said elongated rod therein, and defining said affixing end and said detachable end at two ends of said retention pocket respectively;

a fastening unit which comprises a first fastener provided at said detachable end of each of said retention arms and a second fastener provided at said respective sidewall to detachably fasten with said first fastener; and two tensional frames provided at said sidewalls respectively for providing a tensional force thereat at said setup position to stretch out said sidewalls in a tensional manner, wherein when each of said tensional frames is actuated to reduce said tensional force at said respective sidewall of said blind awning, said sidewall is adapted to overlappedly fold into a compact structure at said folded position, wherein each of said tensional frames comprises an actuation member and a plurality of flexible arms radially extended from said actuation member, wherein each of said flexible arms has an inner end pivotally coupling with said actuation member and an outer end extended to couple at corner portion of said sidewall, in such a manner that when said actuation member is pulled outwardly, said flexible arms are bent outwardly to pop out said sidewall in a tensionally stretchable manner and when said actuation member is pushed inwardly, said tensional force is released at said respective sidewall so as to allow said sidewall being folded.

2. The collapsible hunting blind, as recited in claim 1, wherein said actuation member is affixed to a center of said respective sidewall and has a plurality of engaging slots coupling with said inner ends of said flexible arms with a ball-and-socket joint structure.

3. The collapsible hunting blind, as recited in claim 2, wherein each of said tensional frames further comprises a pulling strap extended from said respective actuation member at an outer side of said sidewall such that when said pulling strap is pulled outwardly, said actuation member is pulled to pop out said sidewall through said flexible arms.

4. The collapsible hunting blind, as recited in claim 3, wherein said tensional frames are coupled at inner sides of said sidewalls respectively.

5. The collapsible hunting blind, as recited in claim 4, wherein said flexible arms are diagonally extended at said respective sidewall to form a "X" structure.

6. The collapsible hunting blind, as recited in claim 5, wherein each of said sidewalls comprises a plurality of holding pockets provided at said corner portions for receiving said outer ends of said flexible arms respectively so as to retain said tensional frame in position.

7. The collapsible hunting blind, as recited in claim 6, wherein each of said sidewalls has a rectangular shape ensuring said tensional force from said tensional frame being evenly disturbing at said sidewall.

8. The collapsible hunting blind, as recited in claim 4, wherein each of said sidewalls comprises a plurality of holding pockets provided at said corner portions for receiving said outer ends of said flexible arms respectively so as to retain said tensional frame in position.

9. The collapsible hunting blind, as recited in claim 1, wherein each of said tensional frames further comprises a pulling strap extended from said respective actuation member at an outer side of said sidewall such that when said pulling strap is pulled outwardly, said actuation member is pulled to pop out said sidewall through said flexible arms.

10. The collapsible hunting blind, as recited in claim 9, wherein said tensional frames are coupled at inner sides of said sidewalls respectively.

11. The collapsible hunting blind, as recited in claim 10, wherein said flexible arms are diagonally extended at said respective sidewall to form a "X" structure.

* * * * *